(12) United States Patent
Jacques et al.

(10) Patent No.: US 12,513,800 B2
(45) Date of Patent: Dec. 30, 2025

(54) POWER CONVERTER AND METHOD OF CONVERTING POWER

(71) Applicant: REDISEM LTD., Hong Kong (CN)

(72) Inventors: Russell Jacques, Shatin (HK); David Coulson, Shatin (HK); Niek van der Duijn Schouten, Shatin (HK); Hon Chee So, Shatin (HK)

(73) Assignee: Redisem LTD., Shatin (HK)

( * ) Notice: Subject to any disclaimer, the term of this patent is extended or adjusted under 35 U.S.C. 154(b) by 0 days.

(21) Appl. No.: 17/921,076

(22) PCT Filed: Apr. 24, 2020

(86) PCT No.: PCT/CN2020/086674
§ 371 (c)(1),
(2) Date: Oct. 24, 2022

(87) PCT Pub. No.: WO2021/212466
PCT Pub. Date: Oct. 28, 2021

(65) Prior Publication Data
US 2023/0171863 A1    Jun. 1, 2023

(51) Int. Cl.
*H05B 45/37* (2020.01)
*H02M 3/00* (2006.01)
*H05B 45/14* (2020.01)

(52) U.S. Cl.
CPC .............. *H05B 45/37* (2020.01); *H02M 3/01* (2021.05); *H05B 45/14* (2020.01)

(58) Field of Classification Search
CPC ...... H05B 45/37; H05B 45/14; H05B 45/382; H05B 45/39; H05B 45/59; H02M 3/01; H02M 1/40; H02M 3/33553; H02M 3/33571; H02M 1/08; H02M 1/32; H02M 1/4266; H02M 1/44; H02M 7/06; H02M 1/0009; H02M 1/0025; Y02B 70/10
See application file for complete search history.

(56) References Cited

U.S. PATENT DOCUMENTS

| 5,357,210 A * | 10/1994 | Miljanic | H03F 1/3229 330/196 |
| 9,894,718 B1 | 2/2018 | Xiong et al. | |
| 10,237,946 B1 * | 3/2019 | Hsia | H02J 7/34 |
| 10,326,377 B1 * | 6/2019 | Xiong | H05B 45/14 |

(Continued)

FOREIGN PATENT DOCUMENTS

| CN | 1085022 | 4/1994 |
| CN | 1826720 | 8/2006 |

(Continued)

*Primary Examiner* — Minh Tran
(74) *Attorney, Agent, or Firm* — LaMorte & Associates, P.C.

(57) ABSTRACT

A power converter comprising an inverter for receiving a supply power and providing an alternating output. An output rectifier receives the alternating output and provides a rectified output to a load. An output winding receives the rectified output, and a sensing winding is inductively coupled to the output winding and provides a sensing output. A controller receives the sensing output and provides a control signal to the inverter for controlling the alternating output. A related method of converting power is also provided.

18 Claims, 11 Drawing Sheets

(56) References Cited

U.S. PATENT DOCUMENTS

| | | | |
|---|---|---|---|
| 2011/0037414 A1* | 2/2011 | Wang | H05B 45/385 |
| | | | 315/297 |
| 2012/0112649 A1 | 5/2012 | Shimura | |
| 2013/0127358 A1 | 5/2013 | Yao | |
| 2016/0302268 A1* | 10/2016 | Dunser | H05B 45/50 |
| 2020/0037408 A1* | 1/2020 | DeJonge | H05B 45/382 |
| 2020/0128634 A1 | 4/2020 | Ajo et al. | |

FOREIGN PATENT DOCUMENTS

| | | |
|---|---|---|
| CN | 105794316 A | 7/2016 |
| CN | 107211496 A | 9/2017 |
| EP | 2 731 249 | 5/2014 |
| JP | H06 48976 | 7/1994 |

* cited by examiner

POWER CONVERTER AND METHOD OF CONVERTING POWER

FIELD OF THE INVENTION

The invention relates to power converters and methods of converting power. The invention has been described for use with light emitting diodes (LEDs) and LED lighting apparatuses, and also described as taking the form of LED lighting drivers and LED lighting apparatuses, but the invention is not limited to these particular applications.

BACKGROUND OF THE INVENTION

The technology of dimmable lighting drivers has been developed to deliver very wide dimming ranges with highly accurate regulation of output current. Most high-performance dimmable LED drivers are based on half-bridge resonant-mode converters, and in particular, those using LCC (inductor-capacitor-capacitor) topologies. Currently, these high-performance dimmable LED drivers achieve superior current regulation by sensing the output current directly on the secondary side and comparing it to a dim control input. Typically, the secondary side sensing circuit provides an error signal which is fed back to a controller on the primary side, to adjust the operating frequency and/or duty cycle.

There is, therefore, active analogue circuitry on both primary and secondary sides, with some form of primary-secondary means of communication, such as an optocoupler, to convey the feedback signal to the controller. To reduce costs, some dimmable LED drivers are designed with the active analogue circuitry entirely on the primary side, sensing the primary current through a current-sense resistor to estimate the LED driver output current. While this approach reduces the costs, it also reduces the accuracy of the output current regulation, particularly at low dimming levels. The primary current is not a totally accurate reflection of the output current, due to the magnetization current of the main transformer.

In another approach, some dimmable LED drivers are designed to use a current transformer (CT) to sense and communicate the output current back to the controller on the primary side of the converter as shown in the representative example in FIG. 1. Here, the CT has two identical input windings T2b and T2c, each of which are connected in series with one of the two output rectifiers D1 and D2. Windings T2b, T2c drive the CT alternately, so that the output winding T2a develops a symmetrical bipolar current which is full-wave rectified by diode bridge DB2 before passing through sense resistor Rs. This method, disclosed in U.S. Pat. No. 9,166,484B2 enables greater dimming accuracy than the primary-sensing solution above, but costs more, largely due to presence of the CT.

A similar method is disclosed in WO2000040058A1 which comprises an electronic ballast employing a CT with two input windings and one output winding. In this disclosure, the currents from two load connections are each passed through one of the input windings, so that the current reflected in the CT output winding represents the arithmetic sum of the two load currents.

It is an object of the present invention to overcome or ameliorate at least one of the disadvantages of the prior art, or to provide a useful alternative.

It is an object of some embodiments of the present invention to provide lower cost lighting drivers, and generally, power converters, and power conversion methods that do not compromise performance when compared with prior apparatuses and methods.

SUMMARY OF THE INVENTION

Embodiments of the present invention in a first aspect provide a power converter comprising:
an inverter for receiving a supply power and providing an alternating output;
an output rectifier for receiving the alternating output and providing a rectified output to a load;
an output winding for receiving the rectified output;
a sensing winding inductively coupled to the output winding and providing a sensing output; and
a controller for receiving the sensing output and providing a control signal to the inverter for controlling the alternating output.

In one embodiment, the output winding is connected to an output of the load. In another embodiment, the output winding is connected to an input of the load.

In one embodiment, the power converter comprises a primary winding connected to the inverter, and a first secondary winding inductively coupled to the primary winding to provide the alternating output to the output rectifier. In one embodiment, the power converter comprises a second secondary winding inductively coupled to the primary winding, the first and second secondary windings providing the alternating output to the output rectifier.

In one embodiment, one end of the output winding is connected between the first and second secondary windings, and another end of the output winding is connected to an output of the load. In another embodiment, one end of the output winding is connected between one output of the output rectifier and an input of the load, and another end of the output winding is connected to another output of the output rectifier.

In one embodiment, one end of the output winding is connected to a junction of, or a point between, the first and second secondary windings, and another end of the output winding is connected to an output of the load. In another embodiment, one end of the output winding is connected to a junction of, or a point between, one output of the output rectifier and an input of the load, and another end of the output winding is connected to another output of the output rectifier.

In one embodiment, the power converter comprises a sensing rectifier to rectify the sensing output.

In one embodiment, the sensing rectifier is a sensing diode connected to an end of the sensing winding.

In another embodiment, the sensing rectifier comprises a sensing amplifier and a sensing diode, one end of the sensing winding connected to one input of the sensing amplifier, another end of the sensing winding connected to another input of the sensing amplifier, and the sensing diode connected to an output of the sensing amplifier. In one embodiment, the power converter comprises a sensing resistor connected between an input of the sensing amplifier and the sensing diode. In one embodiment, the power converter comprises a sensing resistor connected to a junction of an input of the sensing amplifier and the sensing diode.

In one embodiment, the power converter comprises a sensing resistor connected across the sensing winding.

In one embodiment, the power converter comprises a sensing filter to filter the sensing output. In one embodiment, the sensing filter is a filter capacitor connected across the sensing winding.

In one embodiment, the power converter comprises a pull-down circuit connected across the output rectifier.

In one embodiment, the pull-down circuit comprises a pull-down resistor connected across the output rectifier.

In one embodiment, the power converter comprises an output capacitor connected across the load or the output rectifier.

In one embodiment, the power converter comprises a resonant tank. In one embodiment, the resonant tank comprises a series-resonant circuit comprising a series-resonant capacitor and a resonant inductor both connected in series with an output of the inverter and an input of the output rectifier. In one embodiment, the resonant tank comprises a parallel-resonant circuit comprising a parallel-resonant capacitor connected across inputs of the output rectifier.

In one embodiment, the inverter comprises two switches, and the controller provides two of the control signals, each controlling a respective one of the switches.

In one embodiment, the controller also receives a dim signal, and the control signal is based on one or both of the sensing output and the dim signal.

In one embodiment, the controller comprises a control amplifier, the sensing output connected to one input of the control amplifier and the dim signal connected to another input of the control amplifier.

In one embodiment, the controller also receives a current sense signal. In one embodiment, the current sense signal is derived from an output current from the inverter.

In one embodiment, the sensing winding has a ratio of about 100 turns to each turn of the output winding.

Embodiments of the present invention in a second aspect provide a LED lighting apparatus having a power converter as described above.

Embodiments of the present invention in a third aspect provide a method of converting power comprising:

inverting a supply power based on a control signal to provide an alternating output;

rectifying the alternating output to provide a rectified output to a load;

connecting an output winding to the rectified output;

inductively coupling a sensing winding to the output winding to provide a sensing output; and providing the control signal based on the sensing output.

Other features and embodiments of the present invention can be found in the appended claims.

Throughout this specification, including the claims, the words "comprise", "comprising", and other like terms are to be construed in an inclusive sense, that is, in the sense of "including, but not limited to", and not in an exclusive or exhaustive sense, unless explicitly stated otherwise or the context clearly requires otherwise.

BRIEF DESCRIPTION OF THE FIGURES

The accompanying figures include the following figures depicting the prior art.

Figure 1:
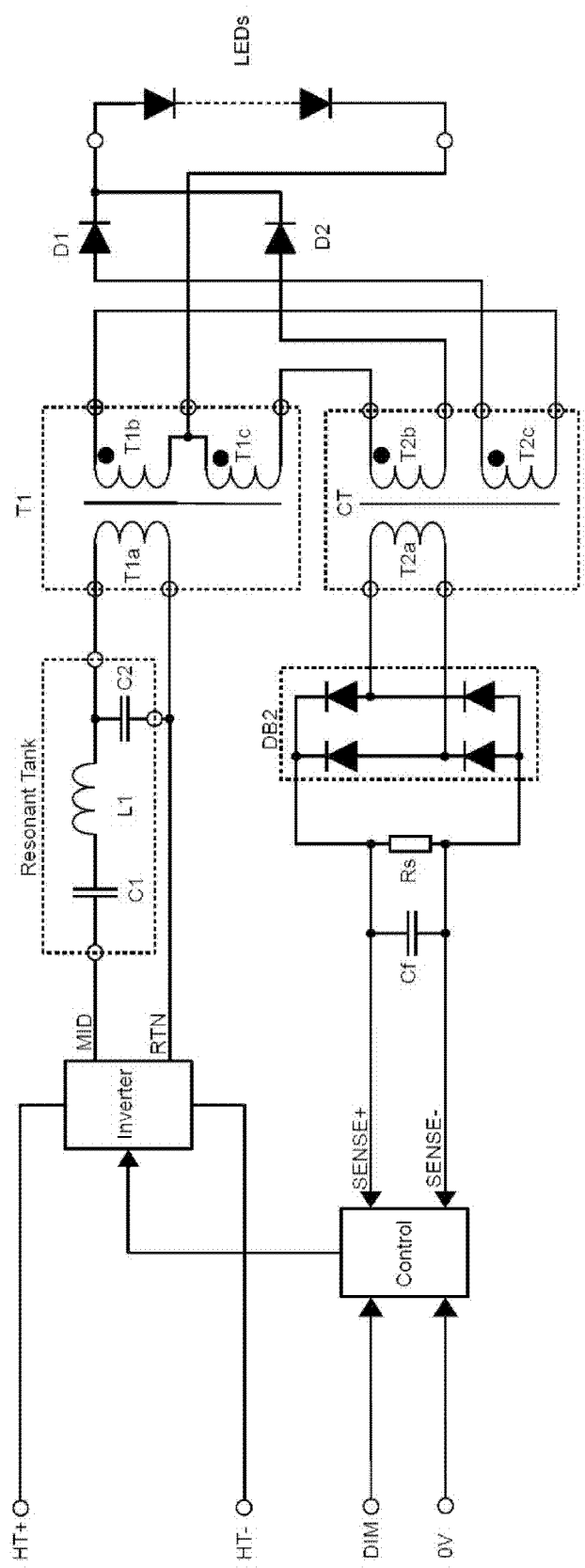
FIG. 1 is a partial schematic diagram of a prior dimmable LED driver (see U.S. Pat. No. 9,166,484B2 and WO2000040058A1) which uses secondary sensing current control.
Figure 3:
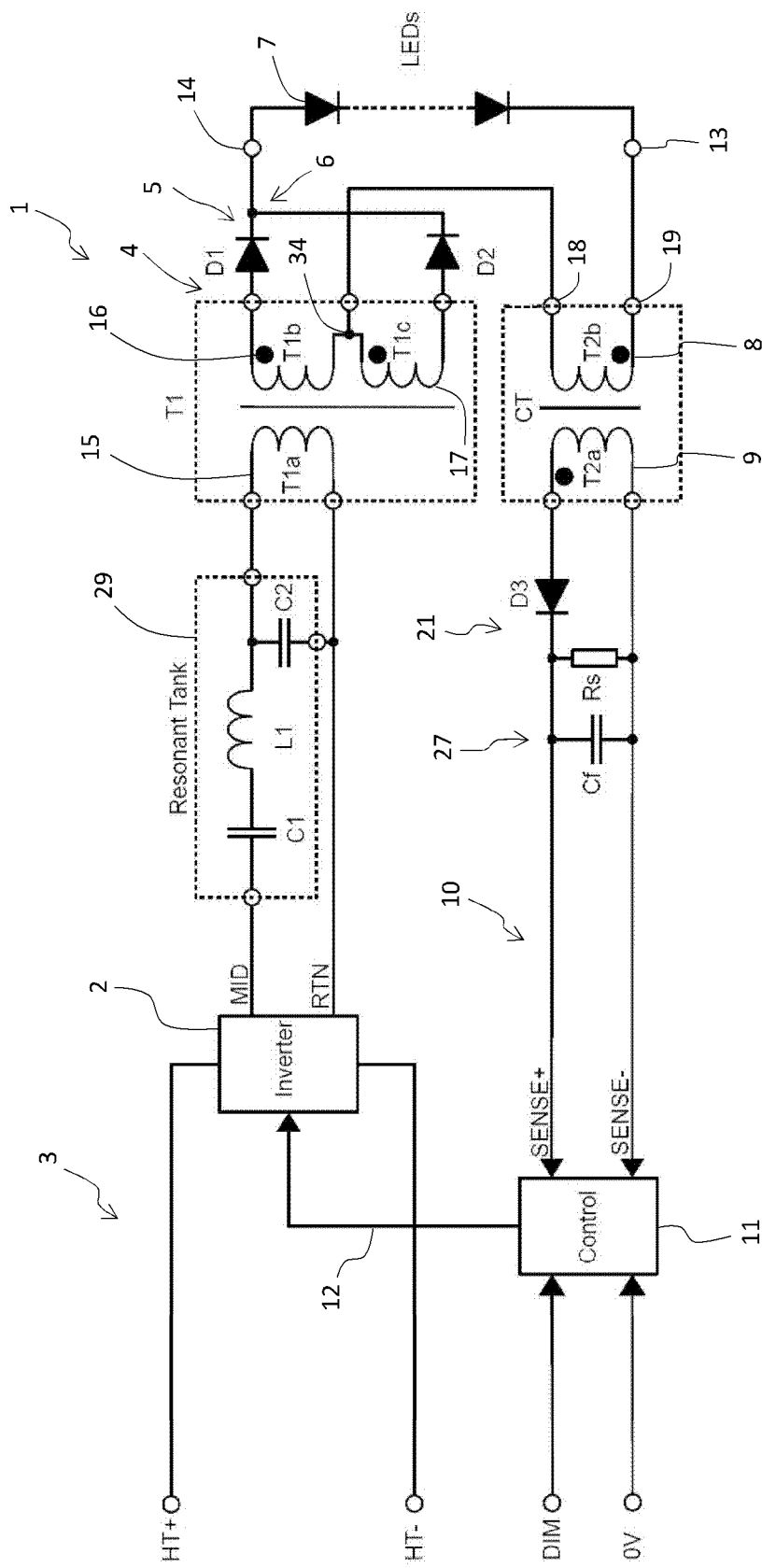
Figure 4:
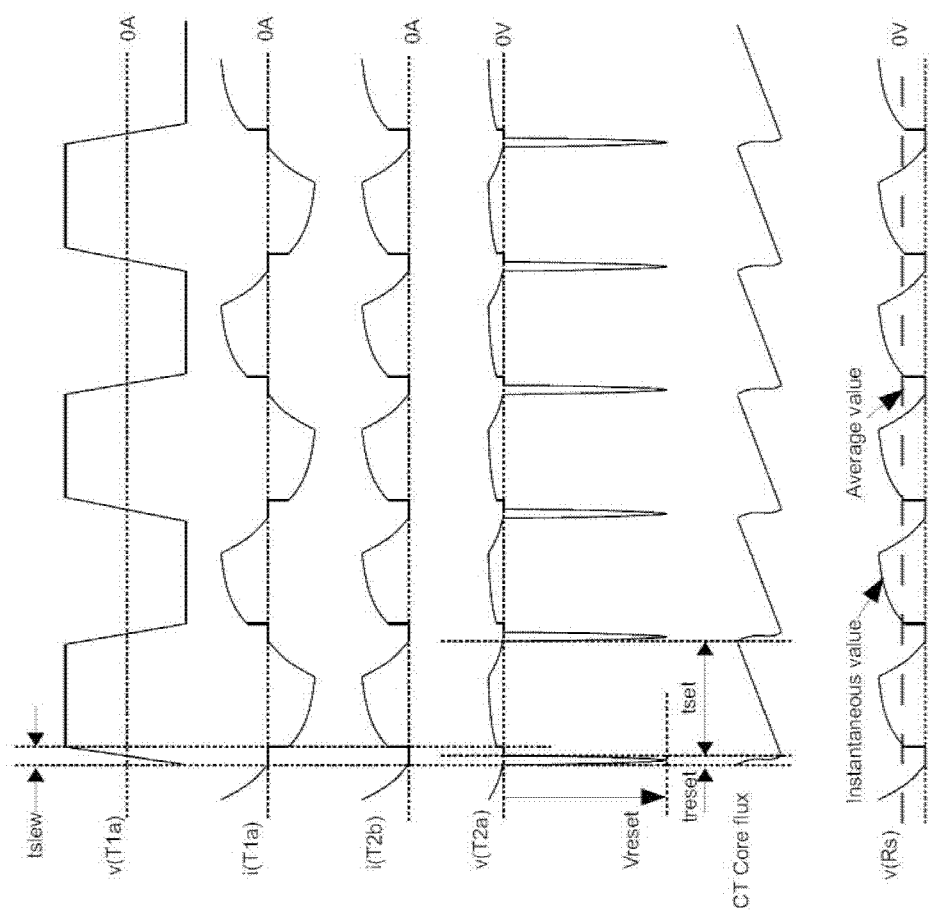
Figure 5:
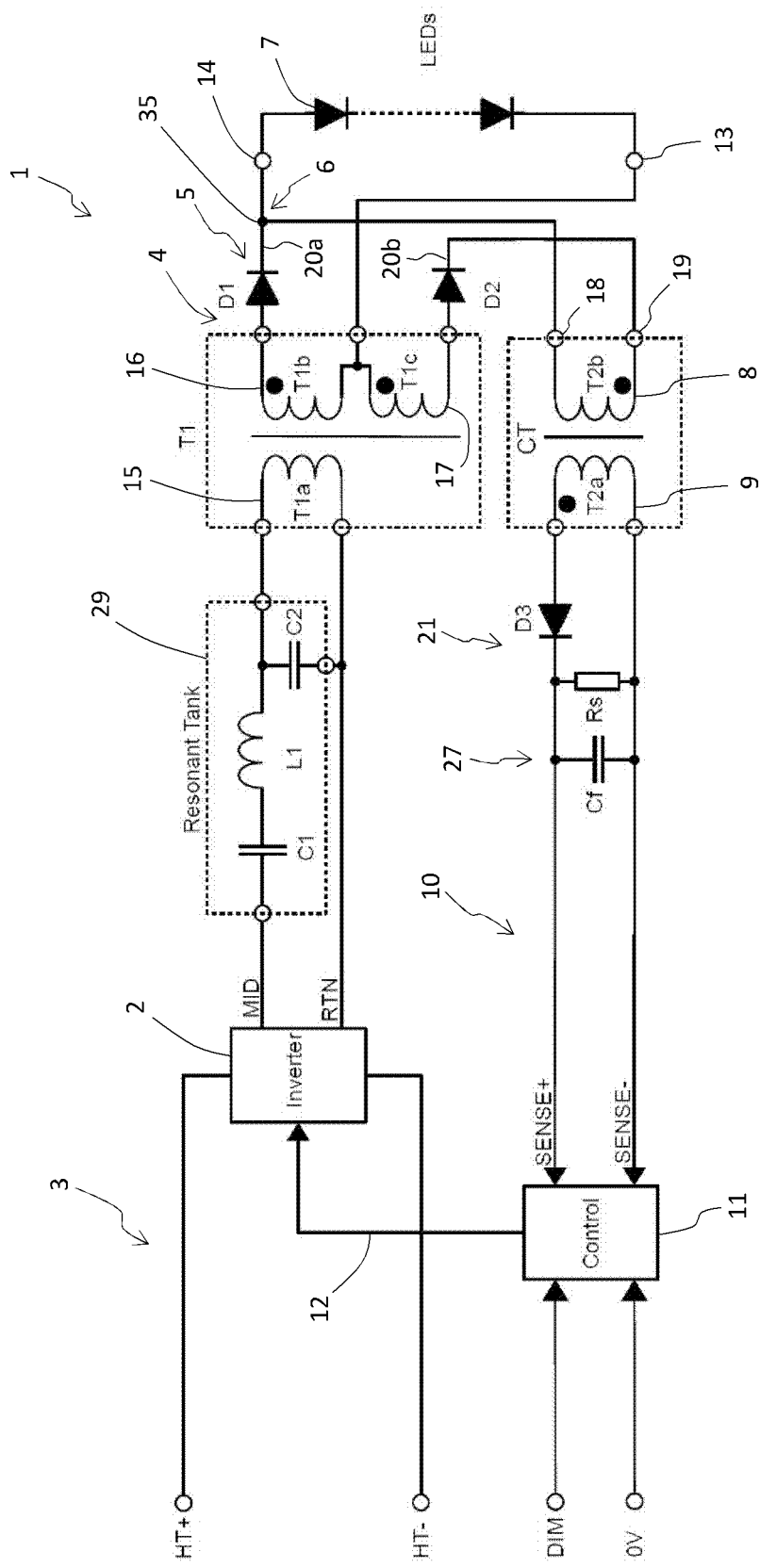
Figure 6:
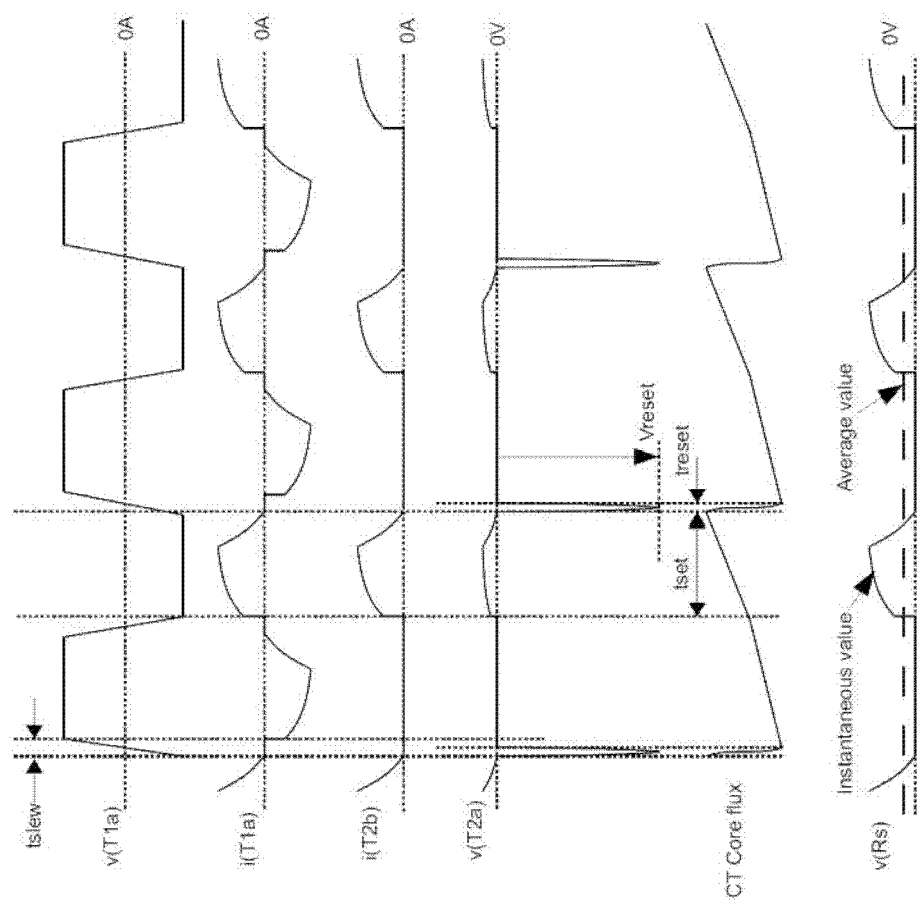
Figure 7:
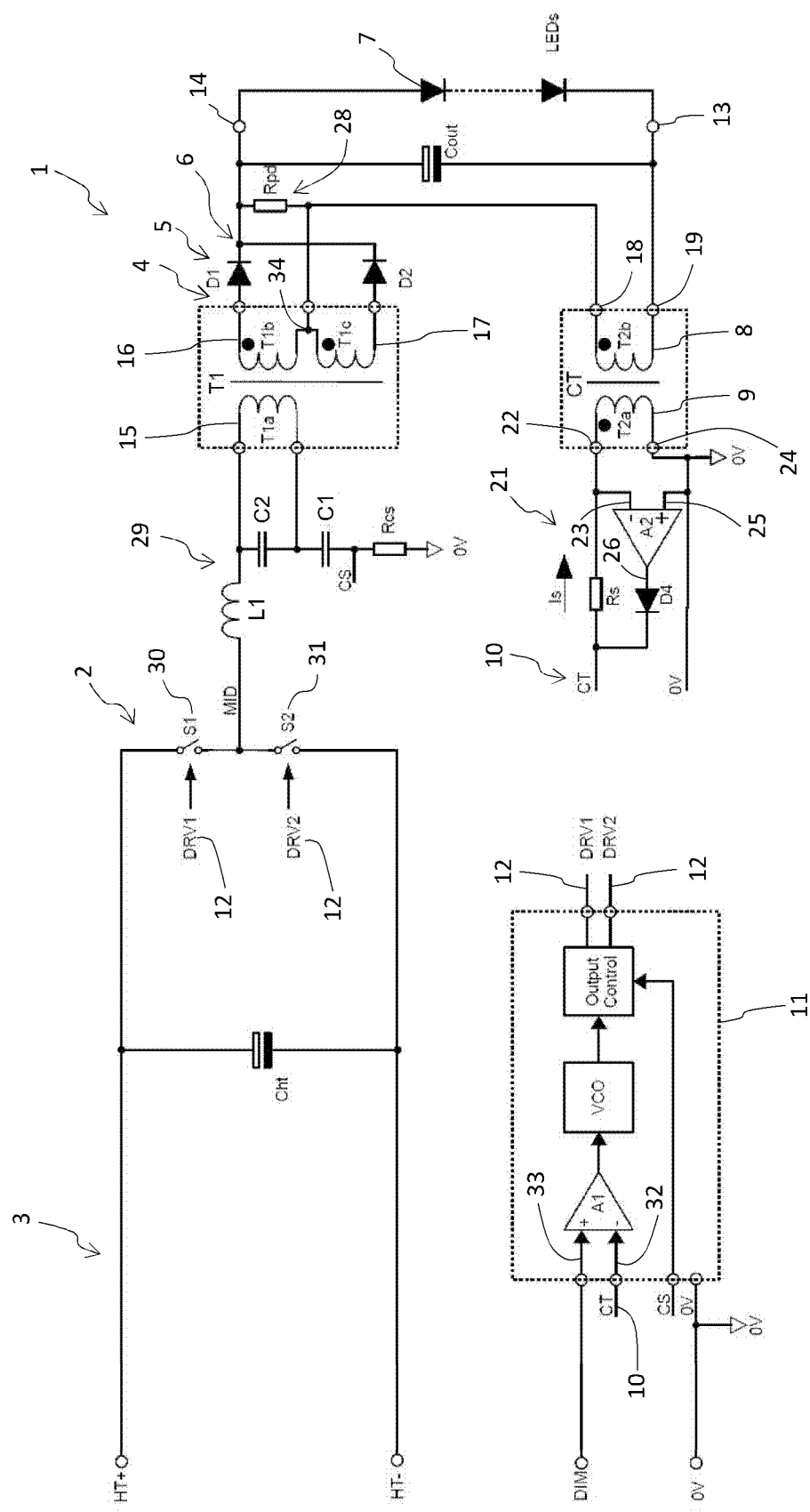
Figure 8:
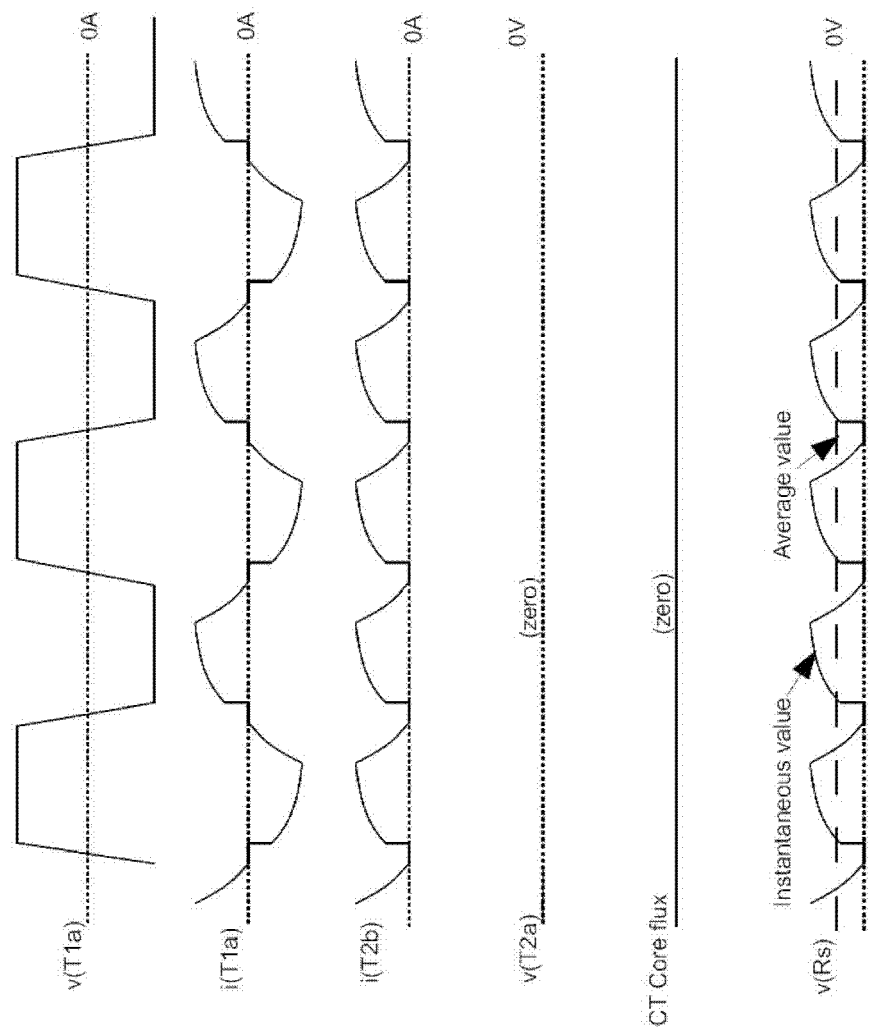
Figure 9:
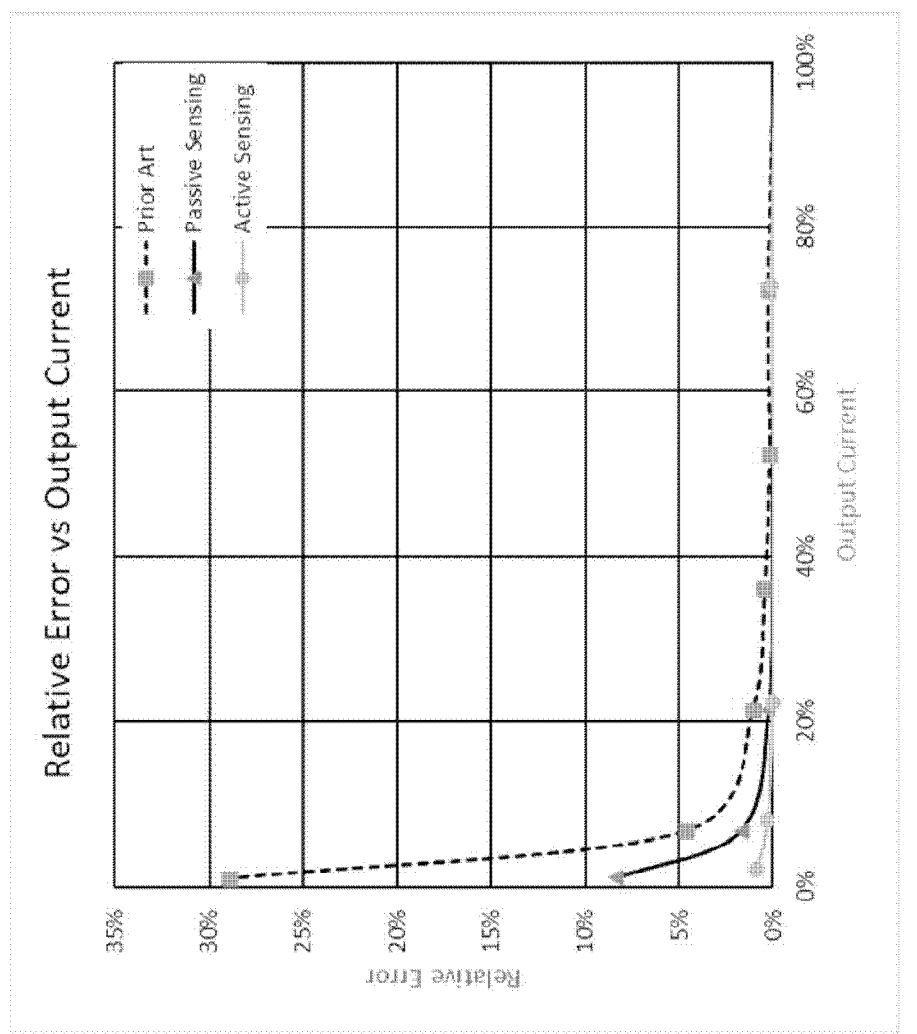
Figure 10:
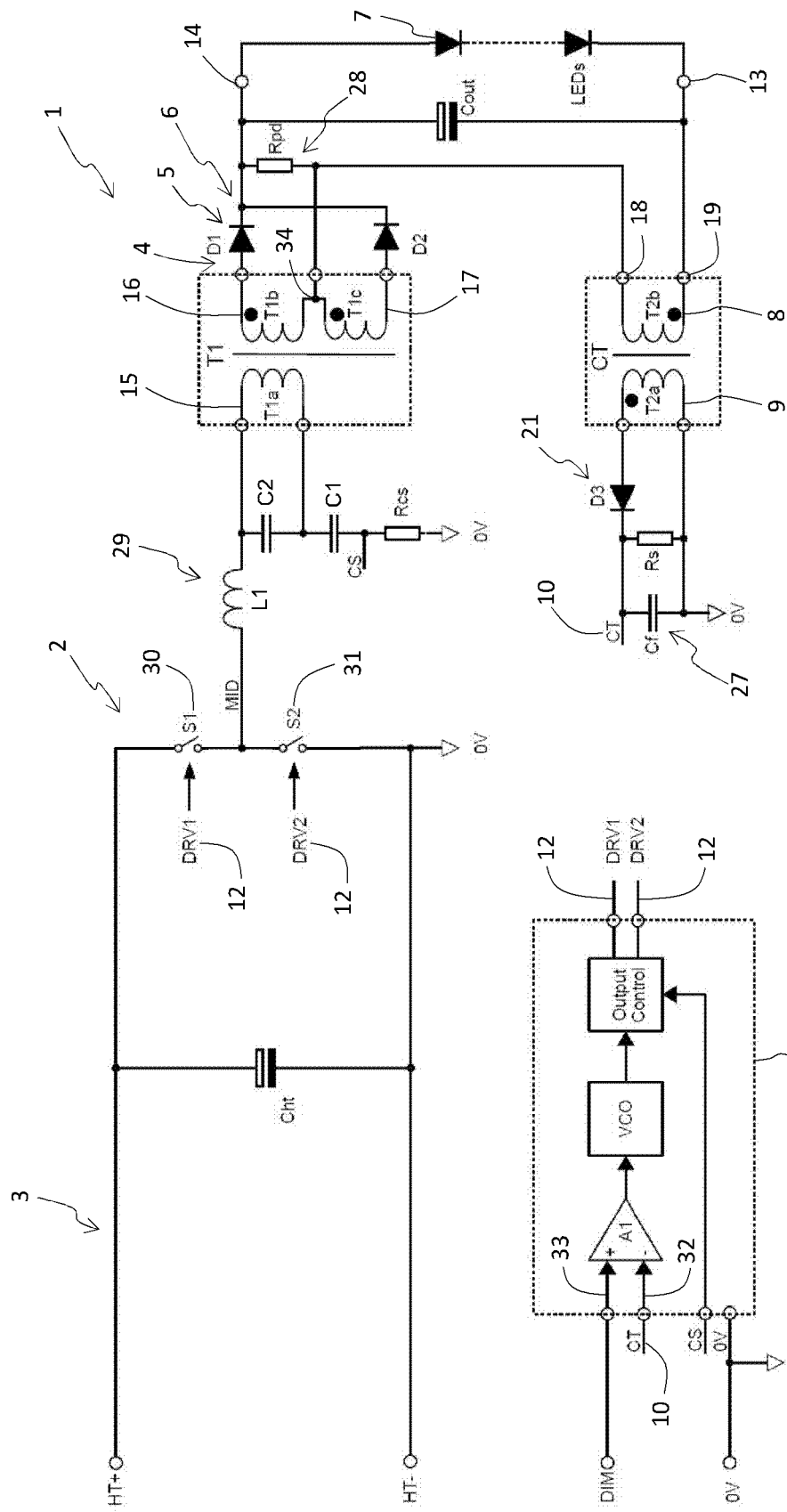
Figure 11:
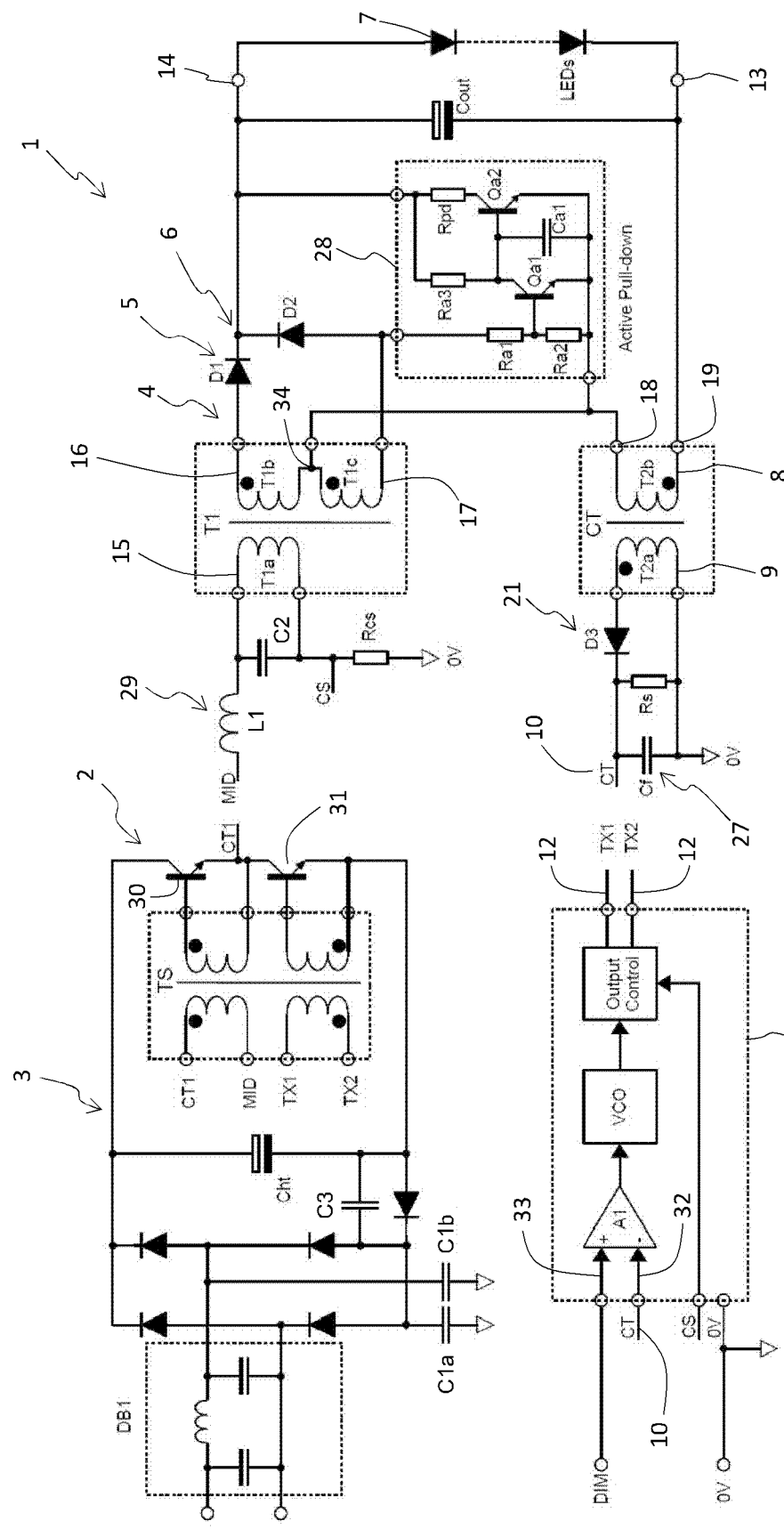

Preferred embodiments in accordance with the best mode of the present invention will now be described, by way of example only, with reference to the accompanying figures listed below, in which the same reference numerals, names, or other reference labels refer to like parts throughout the figures listed below unless otherwise specified, and in which:

FIG. 3 is a partial schematic diagram of a power converter in accordance with an embodiment of the present invention, which is in the form of a dimmable LED driver;

FIG. 4 are graphs showing waveforms relating to the power converter of FIG. 3;

FIG. 5 is a partial schematic diagram of a power converter in accordance with another embodiment of the present invention, which is also in the form of a dimmable LED driver;

FIG. 6 are graphs showing waveforms relating to the power converter of FIG. 5;

FIG. 7 is a partial schematic diagram of a power converter in accordance with yet another embodiment of the present invention, which is also in the form of a dimmable LED driver;

FIG. 8 are graphs showing waveforms relating to the power converter of FIG. 7;

FIG. 9 is a graph showing the relative error in output current control, which represents dimming accuracy, exhibited by the prior dimmable LED driver of FIG. 1 compared with that exhibited by the power converters of embodiments of the present invention as shown in FIGS. 3, 5, and 7;

FIG. 10 is a partial schematic diagram of a power converter in accordance with another embodiment of the present invention, which is in the form of a dimmable LED driver adapted for connection with a DC input supply; and FIG. 11 is a partial schematic diagram of a power converter in accordance with another embodiment of the present invention, which is in the form of a dimmable LED driver adapted for connection with an AC input supply.

Figure 2:
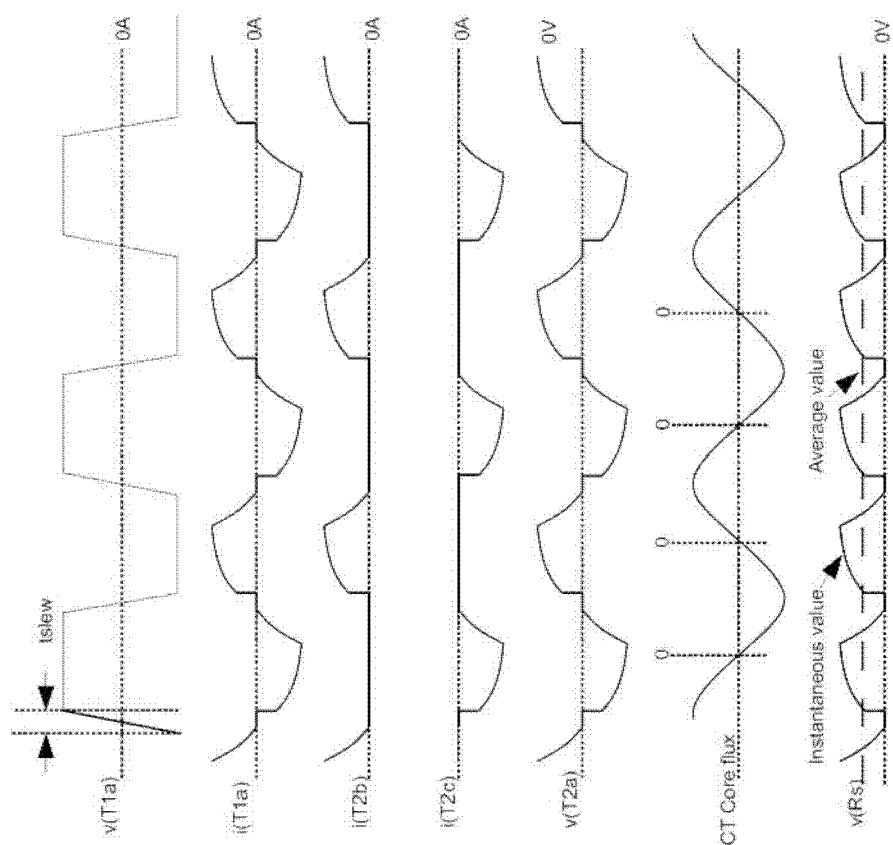
FIG. 2 are graphs showing waveforms relating to the driver of FIG. 1.

For completeness, the reference numerals, names, or other reference labels indicated in FIGS. 1 and 2, which depict prior art, do not correspond to any of the reference numerals, names, or other reference labels indicated in the remaining figures, which depict embodiments of the present invention, unless otherwise specified.

DETAILED DESCRIPTION OF PREFERRED EMBODIMENTS OF THE INVENTION

With reference to FIGS. 3 to 10, there is provided a power converter 1 comprising an inverter 2 for receiving a supply power 3 and providing an alternating output 4. An output rectifier 5 receives the alternating output 4 and provides a rectified output 6 to a load 7. An output winding 8 (T2b) receives the rectified output 6, and a sensing winding 9 (T2a) is inductively coupled to the output winding 8 (T2b) and provides a sensing output 10 (CT signal). A controller 11 receives the sensing output 10 (CT signal) and provides a control signal 12 to the inverter 2 for controlling the alternating output 4.

In some embodiments, and as shown in FIG. 3, the output winding 8 is connected to an output 13 of the load 7. In other embodiments, and as shown in FIG. 5, the output winding 8 is connected to an input 14 of the load 7.

Typically, the power converter 1 comprises isolated primary and secondary circuits. In particular, the power converter 1 comprises a primary winding 15 (T1a) connected to the inverter 2, and a first secondary winding 16 (T1b) inductively coupled to the primary winding 15 (T1a) to provide the alternating output 4 to the output rectifier 5.

In the presently described embodiments, the power converter 1 also comprises a second secondary winding 17 (T1c) inductively coupled to the primary winding 15 (T1a), with the first 16 (T1*b*) and second 17 (T1*c*) secondary windings providing the alternating output 4 to the output rectifier 5. The primary winding 15 (T1*a*) together with the first secondary winding 16 (T1*b*) and/or the second secondary winding 17 (T1*c*) form an isolating transformer T1.

In some embodiments, and as shown in FIG. 3, one end 18 of the output winding 8 is connected between the first 16 and second 17 secondary windings, and another end 19 of the output winding 8 is connected to an output 13 of the load 7. In particular, one end 18 of the output winding 8 is connected to a junction 34 of the first 16 and second 17 secondary windings, and another end 19 of the output winding 8 is connected to an output 13 of the load 7.

In other embodiments, and as shown in FIG. 5, one end 18 of the output winding 8 is connected between one output 20*a* of the output rectifier 5 and an input 14 of the load 7, and another end 19 of the output winding 8 is connected to another output 20*b* of the output rectifier 5. In particular, one end 18 of the output winding 8 is connected to a junction 35 of one output 20*a* of the output rectifier 5 and an input 14 of the load 7, and another end 19 of the output winding 8 is connected to another output 20*b* of the output rectifier 5.

In the presently described embodiments, the power converter 1 comprises a sensing rectifier 21 to rectify the sensing output 10 (CT signal). In some embodiments, and as shown in FIGS. 3, 5, 10, and 11, the sensing rectifier 21 is a sensing diode D3 connected to an end of the sensing winding 9 (T2*a*). A sensing resistor Rs is connected across the sensing winding 9 (T2*a*).

In other embodiments, and as shown in FIG. 7, the sensing rectifier 21 comprises a sensing amplifier A2 and a sensing diode D4. One end 22 of the sensing winding 9 (T2*a*) is connected to one input 23 of the sensing amplifier A2, and another end 24 of the sensing winding 9 (T2*a*) is connected to another input 25 of the sensing amplifier A2. The sensing diode D4 is connected to an output 26 of the sensing amplifier A2. A sensing resistor Rs is connected between an input 23 of the sensing amplifier A2 and the sensing diode D4.

The power converter 1 comprises a sensing filter 27 to filter the sensing output 10 (CT signal). In some embodiments, and as shown in FIGS. 3, 5, 10, and 11, the sensing filter 27 is a filter capacitor Cf connected across the sensing winding 9 (T2*a*).

As shown in FIGS. 7, 10, and 11, the power converter 1 comprises a pull-down circuit 28 connected across the output rectifier 5. In some embodiments, and as shown in FIGS. 7 and 10, the pull-down circuit 28 comprises only a pull-down resistor Rpd connected across the output rectifier 5. In other embodiments, and as shown in FIG. 11, the pull-down circuit 28 is more complex and comprises further components in order to realise further functionalities. The specific embodiment of the pull-down circuit 28 shown in FIG. 11 will be described in further detail below.

In some embodiments, and as shown in FIGS. 7, 10, and 11, the power converter 1 comprises an output capacitor Cout connected across the load 7.

Typically, the power converter 1 comprises a resonant tank 29. The resonant tank 29 can comprise a series-resonant circuit and a parallel-resonant circuit as shown in FIGS. 3, 7, and 10. Typically, the series-resonant circuit comprises a series-resonant capacitor C1 and a resonant inductor L1 both connected in series with an output MID of the inverter 2, and an input of the output rectifier 5. Typically, the parallel-resonant circuit comprises a parallel-resonant capacitor C2 connected across inputs of the output rectifier 5 which resonates with the resonant inductor L1. Typically, in drivers with isolated outputs as shown in the figures, the isolating transformer T1 is interposed between the output of the resonant tank 29 and the inputs of the output rectifier 5. Optionally, the resonant tank 29 can be arranged differently to provide additional functionality. For example, in the application circuit of FIG. 11 the series-resonant capacitance is provided by two capacitors C1*a* and C1*b*, and an additional capacitor C3 to provide passive power factor correction.

In the embodiments shown in FIGS. 7, 10, and 11, the inverter 2 comprises two switches 30 and 31, and the controller 11 provides two of the control signals 12 (DRV1 and DRV2, or TX1 and TX2), each controlling a respective one of the switches 30 and 31.

In some embodiments, such as those in which the power converter is in the form of a dimmable LED driver, the controller 11 also receives a dim signal DIM, and the control signal 12 is based on one or both of the sensing output 10 (CT signal) and the dim signal DIM.

The controller 11 can comprise a control amplifier A1, with the sensing output 10 (CT signal) connected to one input 32 of the control amplifier A1 and the dim signal DIM connected to another input 33 of the control amplifier A1. The controller can also receive a current sense signal CS. The current sense signal CS can be derived from an output current from the inverter 2.

It has been found that a sensing winding 9 (T2*a*) having a large ratio of turns to each turn of the output winding 8 (T2*b*) provides surprisingly good performance. A sensing winding 9 (T2*a*) having a ratio of about 100 turns to each turn of the output winding 8 (T2*b*) provides particularly good performance.

The power converter 1 described above can also comprise the load 7. The load 7 can be LEDs. The power converter 1 can be provided or sold with the load 7, or the load 7 can be integrated with the power converter 1.

Embodiments of the present invention can also be in the form of a LED lighting apparatus having the power converter 1 as described above.

Embodiments of the present invention also provide a method of converting power. One embodiment of the method comprises: inverting the supply power 3 based on the control signal 12 to provide the alternating output 4; rectifying the alternating output 4 to provide the rectified output 6 to the load 7; connecting the output winding 8 (T2*b*) to the rectified output 6; inductively coupling the sensing winding 9 (T2*a*) to the output winding 8 (T2*b*) to provide the sensing output 10 (CT signal); and providing the control signal 12 based on the sensing output 10 (CT signal).

Other embodiments and features of the method are clear from the foregoing description, including the description in respect of the power converter 1.

The power converter 1 and associated method of converting power are well-suited to power converters that act as drivers for one or more LEDs or LED lighting apparatus or systems. These include power converters that act as dimmable LED drivers and luminaires and those based on switch mode power supplies (SMPS). More generally, the power converter 1 and associated method of converting power are well-suited to power converters that have output transformers with complementary secondary windings and rectification circuits.

Considering the figures now in greater detail, FIG. 3 shows an embodiment of the power converter 1 in the form of a dimmable LED driver.

The sensing output 10 is in the form of a current sense signal (SENSE+, SENSE−) generated by passively rectifying the signal from the sensing winding 9 (T2a) using the sensing diode D3 and passing the current through a current sensing resistor Rs. The signal can be low-pass filtered by sensing filter 27 (in the form of filter capacitor Cf) to give the average before the signal is provided to the controller 11. The controller 11 compares the sensing output (SENSE+, SENSE−) with desired dimming level (set by dim signal DIM) and controls the switching frequency of the inverter 2 to regulate the alternating output 4, and in particular, the output current. The inverter 2 contains two switches 30 and 31 which connect the mid-point (MID) to either the HT+ supply rail or HT− supply rail, depending on the state of the VCO output signal. The output of the inverter 2 drives the input of a series-shunt resonant tank 29, whose output terminals are connected to the primary side winding 15 (T1a) of the main switching transformer T1. The output windings of T1 (first and second secondary windings 16 (T1b) and 17 (T1c)) are complementary, so that the two diodes D1 and D2, which form the output rectifier 5, conduct alternately to provide the rectified output 6, that is, a DC output current, to the load 7, which is in the form of LEDs. The output winding 8 (T2b) is connected in series with the output rectifier diodes D1 and D2 to receive the rectified output 6 which is in the form of a pulsatile rectified DC output current. For best performance, the turns ratio between the sensing winding 9 (T2a) and the output winding 8 (T2b) is large, e.g. 100 turns for the sensing winding 9 (T2a) to 1 turn for the output winding 8 (T2b), to provide a useful current sense signal while minimising the transformer magnetizing current.

In the prior driver shown in FIG. 1, the current transformer (CT) has two output windings T2b and T2c receiving rectified currents from each of the first and second secondary windings T1b and T1c. The windings and connections are arranged so that the summed current reflected in the CT primary-side winding T2a is effectively unrectified, as shown in the waveforms of FIG. 2. By contrast, in embodiments of the present invention (see FIG. 3 for example), the current reflected in sensing winding 9 (T2a) is rectified, as shown in the waveforms of FIG. 4. This difference is reflected in the behaviour of the magnetic flux generated in the core of the CT, as shown by the waveforms in FIG. 2 and FIG. 4.

The core flux is an undesirable feature of a CT, as it creates an error in the transferred current. In prior drivers, the core flux inverts on each consecutive half-cycle and is therefore self-balancing. However, in embodiments of the present invention, the flux does not invert on alternate half-cycles and therefore requires a time to reset the core (treset in FIG. 4). As seen from FIG. 4, there is a time-interval tslew when the output rectifier diodes D1 and D2 and current sensing diode D3 are non-conducting, so that the CT windings are effectively unclamped and free to commutate, allowing the core flux to be reset.

To maintain best accuracy and avoid possible core saturation, the core should be fully reset after each half-cycle, meaning that tslew must always be bigger than treset (the time taken to reset the core). This interval tslew is dependent on intrinsic capacitance (of the main transformer, output diodes, etc.) and is smallest when the LED driver (power converter 1) is delivering maximum output current. Connecting a parallel resonant capacitance (C2 in FIG. 1 and FIG. 3) can help by increasing the slew time. The value of treset is mainly determined by the self-resonant frequency of the CT, calculated from the CT self-inductance LT2a and intra-winding capacitance CT2a according to the equation below:

$$t_{reset} = \pi \times \sqrt{L_{T2a} \times C_{T2a}}$$

and typically has a value of about 0.5 microseconds. While the core is being reset, the waveform appearing across the CT primary winding (sensing winding 9 (T2a)) appears as a sine wave half-cycle, reverse-biasing the current sensing diode D3. The minimum voltage rating required for D3 is estimated using the equation below:

$$V_{RATING} \cong (V_{SENSEmax} + V_{DFmax}) \times \frac{2\sqrt{2}}{F_{min} \times t_{reset}}$$

Where:

$V_{SENSE}$ is the sense voltage developed across the sensing resistor (Rs in FIG. 6);

$V_{DF}$ is the forward conduction voltage of the sensing diode (D3 in FIG. 6);

$F_{min}$ is the minimum operating frequency of the inverter 2.

The frequency of the core flux waveform in embodiments of the present invention (see FIG. 4) is twice the frequency of that in the prior driver of FIG. 1 (see FIG. 2). Furthermore, the shape of the core flux waveform is quite different, in that the rising and falling times are equal in FIG. 2 but different in FIG. 4. These two differences reduce the amplitude of the core flux swings, thereby improving the CT transfer accuracy. FIG. 7 compares the current sensing accuracy of the embodiment of the present invention shown in FIG. 3 with that of the prior driver of FIG. 1, demonstrating that embodiments of the present invention are approximately three times better in this regard.

In the embodiment of the present invention shown in FIG. 5, the CT can be used in a half-wave configuration. Here, the secondary-side winding (output winding 10 (T2b)) is connected in series with only one of the output diodes D2, so that the current through the CT is 50% of the total output current. The relevant waveforms are shown in FIG. 6. Comparing the waveforms of FIG. 4 and FIG. 6, treset (the available time for resetting the core) is much greater, eliminating the need to minimize the parasitic capacitances, such as the CT intra-winding capacitance.

Comparing FIG. 1, FIG. 3, and FIG. 5, there are two significant cost-saving differences provided because the present invention uses a CT with fewer windings and fewer diodes. It is therefore shown that the present invention improves on the prior art by providing a solution with improved accuracy and reduced costs.

The methods so far described use passive rectification to sense the signal from the CT. As discussed earlier, the magnetizing current of the CT must be minimized to achieve greatest accuracy, which means that the voltage swings experienced by the CT must also be minimized. These voltage swings are the arithmetic sum of the forward voltage of sensing diode D3 and the SENSE signal voltage (sensing output 10). Both contributions can be eliminated by using an active method for rectifying and detecting the current sense signal, as described below.

An active circuit which eliminates the magnetizing current in the CT is shown in FIG. 7. In this example, sensing amplifier A2 and sensing diode D4 together comprise a voltage-current converter with precision rectification. The sensing amplifier A2 works by driving the output to keep the positive and negative inputs at the same voltage. During the forward phase (when either D1 or D2 are conducting) current flows through the CT winding T2b (output winding 8) and is transformed into a current through CT sensing winding T2a (shown by the arrow in FIG. 7), this being supplied by sensing amplifier A2 via sensing diode D4 and sensing resistor Rs. Since the voltage of the terminals of T2a are held at the same voltage, no core magnetization takes place. The current sense signal is thus generated by the voltage across Rs, appearing at terminals CT and 0V. During the reverse phase (when neither D1 nor D2 are conducting) the output of sensing amplifier A2 drives negative, switching off sensing diode D4 so that the current sense signal drops to zero. At this time, both windings of the CT are free to commutate, allowing the core to be reset, but because there has been no core magnetization during the forward phase, no core reset is necessary.

The relevant waveforms are shown in FIG. 8. In practice, the reverse leakage of the output diodes D1 and D2 and the input offset error of the amplifier A2 give rise to a little core magnetization which, in turn, has a small influence on the achieved current sensing accuracy.

The typical current sense accuracy achieved by each of the described methods is compared with the prior driver of FIG. 1 in FIG. 9. Comparing embodiments of the present invention to the prior driver in the same application circuit, the accuracy achieved with the passive sensing methods of embodiments of the present invention is approximately three times better, while the active sensing method of embodiments of the present invention is approximately thirty times better.

Representative schematics of dimmable LED drivers for use in a luminaire, in accordance with embodiments of the present invention are shown in FIG. 10 and FIG. 11. The sensing output 10 (current sense signal CT) appears across the sense resistor Rs and is compared with a dimming control input DIM by control amplifier A1, which provides load current regulation by controlling the converter switching frequency. A separate current sense signal CS, derived from the current in the primary-side resonant tank 29, is also used to control the timing of the inverter 2. A common requirement of dimmable LED drivers is the ability to dim down to zero, i.e. to extinguish the LED or LEDs completely. Some converters may operate in burst mode in order for the control ICs to remain powered. Without any loading, this can cause the voltage of the rectified output to float upwards, partly illuminating the LED, so a resistor is typically connected across the LEDs to prevent this happening. However, a pull-down resistor connected directly across the LEDs causes an error in the output current level, which becomes significant at low dimming levels. Embodiments of the present invention provide the opportunity to use a pull-down circuit 28 in a way that does not compromise the current sensing accuracy. In FIG. 10, a single pull-down resistor Rpd is shown connected directly across the rectified output 6, so that the pull-down current cannot flow though the CT and adversely affect the current sensing.

In addition, this pull-down circuit 28 can be selectively deactivated, for example when the LED driver is operating continuously, allowing a stronger pull-down without adversely affecting operating efficiency. An example of such a pull-down circuit 28 is shown in FIG. 11 comprising Ra1, Ra2, Ra3, Ca1, Qa1, Qa2, and pull-down resistor Rpd. Ra1 and Ra2 are sized to avoid reverse breakdown of the base-emitter diode of Qa1; Ra3 is much larger than Rpd; the time constant of Ra3 and Ca1 is many multiples of the maximum switching period.

It is appreciated that the aforesaid embodiments are only exemplary embodiments adopted to describe the principles of the present invention, and the present invention is not merely limited thereto. Various variants and modifications can be made by those of ordinary skill in the art without departing from the spirit and essence of the present invention, and these variants and modifications are also covered within the scope of the present invention. Accordingly, although the invention has been described with reference to specific examples, it is appreciated by those skilled in the art that the invention can be embodied in many other forms. It is also appreciated by those skilled in the art that the features of the various examples described can be combined in other combinations. In particular, it is appreciated by those skilled in the art that there are different variations of the circuits described above within the scope of the present invention. There are many possible permutations of the circuit arrangements described above which are appreciated by those skilled in the art. Accordingly, the circuit components shown in the embodiments can be interchanged freely, placed in different arrangements or order, but still provide the functionality described in respect of the circuit as originally arranged or ordered in the described embodiments, and therefore, still falling within the scope of the present invention.

The invention claimed is:

1. A power converter comprising:
an inverter for receiving a supply power and providing an alternating output;
an output rectifier for receiving the alternating output and providing a rectified output to a load;
an output winding for receiving the rectified output, wherein the output winding connects to the load;
a sensing winding inductively coupled to the output winding and providing a sensing output, wherein the sensing output is a current sense signal;
a sensing rectifier to rectify the current sense signal; and
a controller for receiving the current sense signal and providing a control signal to the inverter for controlling the alternating output,
wherein the inverter comprises two switches, and the controller provides two control signals, each controlling a respective one of the switches.

2. The power converter according to claim 1 comprising a primary winding connected to the inverter, and a first secondary winding inductively coupled to the primary winding to provide the alternating output to the output rectifier.

3. The power converter according to claim 2 comprising a second secondary winding inductively coupled to the primary winding, the first secondary winding and the second secondary winding providing the alternating output to the output rectifier.

4. The power converter according to claim 3 wherein the output winding has one end that is connected to a junction of the first secondary winding and the second secondary winding, and the output winding has a second end that is connected to the load.

5. The power converter according to claim 3 wherein the output winding is connected to a junction of the output rectifier and the load, and the output winding is connected to the output rectifier.

6. The power converter according to claim 1 wherein the sensing rectifier is a sensing diode connected to the sensing winding.

7. The power converter according to claim 1 wherein the sensing rectifier comprises a sensing amplifier and a sensing diode, the sensing winding has a first end that connects to the sensing amplifier, and a second end that connects to the sensing amplifier, and the sensing diode connected to the sensing amplifier.

8. The power converter according to claim 1, comprising a sensing resistor connected across the sensing winding.

9. The power converter according to claim 1, further including a sensing filter to filter the current sense signal.

10. The power converter according to claim 1, further including a pull-down circuit connected across the output rectifier.

11. The power converter according to claim 1, further including a resonant tank.

12. The power converter according to claim 1, wherein the controller receives a dim signal, and the control signal is based on one or both of the current sense signal and the dim signal.

13. The power converter according to claim 12 wherein the controller includes a control amplifier, the current sense signal connected to the control amplifier and the dim signal connected to the control amplifier.

14. The power converter according to claim 1, wherein the controller receives a primary-side current sense signal.

15. The power converter according to claim 14 wherein the primary-side current sense signal is derived from an output current from the inverter.

16. The power converter according to claim 1, wherein the sensing winding has a ratio of about 100 turns to each turn of the output winding.

17. A LED lighting apparatus having a power converter according to claim 1.

18. A method of converting power comprising:
inverting a supply power based on a control signal to provide an alternating output;
rectifying the alternating output to provide a rectified output to a load;
connecting an output winding to the rectified output, wherein the output winding connects to the load;
inductively coupling a sensing winding to the output winding to provide a sensing output, wherein the sensing output is a current sense signal;
rectifying the current sense signal; and
providing the control signal based on the current sense signal,
wherein the supply power is inverted with two switches, and two signals are provided, each controlling a respective one of the switches.

* * * * *